United States Patent [19]

Dao et al.

[11] Patent Number: 5,596,744
[45] Date of Patent: Jan. 21, 1997

[54] APPARATUS AND METHOD FOR PROVIDING USERS WITH TRANSPARENT INTEGRATED ACCESS TO HETEROGENEOUS DATABASE MANAGEMENT SYSTEMS

[75] Inventors: Son K. Dao, Northridge; Nader Ebeid, Westlake Village, both of Calif.

[73] Assignee: Hughes Aircraft Company, Los Angeles, Calif.

[21] Appl. No.: 64,690

[22] Filed: May 20, 1993

[51] Int. Cl.$^6$ .................................................. G06F 17/30
[52] U.S. Cl. .................. 395/610; 364/282.1; 364/282.4; 364/DIG. 1
[58] Field of Search ............................................. 395/600

[56] References Cited

U.S. PATENT DOCUMENTS

| | | | |
|---|---|---|---|
| 4,714,995 | 12/1987 | Materna et al. | 395/600 |
| 4,769,772 | 9/1988 | Dwyer | 395/600 |
| 4,881,166 | 11/1989 | Thompson | 395/600 |
| 4,930,071 | 5/1990 | Tou et al. | 395/600 |
| 5,058,000 | 10/1991 | Cox et al. | 395/600 |
| 5,187,787 | 2/1993 | Skeen et al. | 395/600 |
| 5,202,983 | 4/1993 | Orita et al. | 395/600 |
| 5,202,996 | 4/1993 | Sugino et al. | 395/700 |
| 5,235,701 | 8/1993 | Ohler et al. | 395/600 |
| 5,239,648 | 8/1993 | Nukui | 395/600 |
| 5,247,664 | 9/1993 | Thompson et al. | 395/600 |
| 5,257,366 | 10/1993 | Adair et al. | 395/600 |
| 5,257,369 | 10/1993 | Skeen et al. | 395/650 |
| 5,278,978 | 1/1994 | Demers et al. | 395/600 |
| 5,295,261 | 3/1994 | Simonetti | 395/600 |
| 5,329,619 | 7/1994 | Page et al. | 395/600 |
| 5,339,434 | 8/1994 | Rusis | 395/700 |
| 5,345,586 | 9/1994 | Hamala et al. | 395/650 |
| 5,369,761 | 11/1994 | Conley et al. | 395/600 |

OTHER PUBLICATIONS

Dao et al, "Smart Data Dictionary: A Knowledge–Object Oriented Approach for Interoperability of Heterogeneous Information Management Systems", IEEE, 1991, pp. 88–91.

Chung et al, "A Relational Query Language Interface to a Hierarchical Database Management System," IEEE, 1989, pp. 105–112.

Ruszmiewicz et al, "Query Transformation In Heterogenous Distributed Database Systems" 5$^{th}$ International Conf. On Distributed Computer Systems May 1985 pp. 300–307.

Elmasre et al, "Fragmentation and Query Decomposition in the ECR Model", Feb. 1987 Times International Conf on Data Engineering pp. 468–476.

Kang et al, "Global Query Management in Heterogeneous Distributed Database Systems", Sep. 1993 Microprocessing and Microprogramming pp. 377–384.

Primary Examiner—Thomas G. Black
Assistant Examiner—Jack M. Choules
Attorney, Agent, or Firm—V. D. Duraiswamy; W. K. Denson-Low

[57] ABSTRACT

Disclosed is a federated architecture and system which are extensible and flexible for integrated access to heterogeneous DataBase Management Systems (DBMS) dispersed over a long haul network, allowing transparent access to a wide variety of DBMS while maintaining the local autonomy of the underlying DBMS. In addition the system can run on top of different hardware, operating systems, network communications, and DBMS. The system can include new target DBMS with minimum changes and is not limited to integrate relational DBMS, but also to integrate legacy DBMS such as hierarchial or network DBMS, spatial information or text retrieval systems.

22 Claims, 9 Drawing Sheets

APPARATUS AND METHOD FOR PROVIDING USERS WITH TRANSPARENT INTEGRATED ACCESS TO HETEROGENEOUS DATABASE MANAGEMENT SYSTEMS

BACKGROUND OF THE INVENTION

1. Field of the Invention

This invention relates in general to an architecture and method useful in computer data networks, and, more particularly, to a federated (global) architecture and system which are extensible and flexible for providing users with transparent integrated access to heterogeneous DataBase Management Systems (DBMS) dispersed over a long haul network.

2. Description of the Related Art

During the past decade, large scale organizations and environments have initially adopted heterogeneous and incompatible information systems in an uncoordinated way; independent of each other and without consideration that one day they may need to be integrated. As a result, information systems have become more and more complex, and are characterized by several types of heterogeneity. For example, different DataBase Management Systems (DBMS) models may be used to represent data, such as the hierarchical, network, and relational models. Aside from databases, many software systems (such as spreadsheets, multimedia databases and knowledge bases) store other types of data, each with its own data model. Furthermore, the same data may be seen by various users at different levels of abstraction. Because of such differences, users find it difficult to understand the meaning of all the types of data presented to them. Analysts, operators and current data processing technology are not able to organize, process and intelligently analyze these diverse and massive quantities of information. Their inefficiency often results in late reports to decision makers, missed intelligence opportunities and unexploited data.

One of the needs is to access and manage existing and new earth science data. The data is been collected and stored within a number of different DBMSs and image files for the purpose of monitoring global earth processes. The earth science data are collected by different information systems including data concerning: climate, land, ocean, etc., which are composed of relational databases, images, and files. These systems were designed independently and operate in completely different ways as to how the data are stored and accessed. Moreover, they are tailored to different hardware platforms. So, in order to access the data, the users must learn how to access different systems. This increases training costs and reduces user productivity. In addition, the majority of users do not have the level of computer science expertise necessary to learn the different individual systems within a short period of time, thus discouraging them from accessing dispersed data, or in some instances from even knowing what data are available for their use.

The same problems occur in the Computer Integrated Manufacturing (CIM) environment. CIM is a very complex network of physical activities, decision making and information flow. Most manufacturing facilities contain independently designed and dispersed information bases. In such an environment, improvement in manufacturing productivity can be obtained by providing timely access to all essential data, local or distributed. Present CIM systems lack a federated, i.e., global, database which contains information required for all phases of manufacturing, that is, design, process, assembly and inspection. Usually, manufacturing processes are treated independently from the other phases. This is undesirable in the sense that data or knowledge from one process is not available for use by another. There is need to integrate data so that they can be made globally available to the users and processes of a CIM system.

In conclusion, there is an urgent need to integrate these dispersed data to provide uniform access to the data, to maintain integrity of the data, and to control its access and use. Rather than requiring users to learn a variety of interfaces in order to access different databases, it is preferable that a single interface be made available which provides access to each of the DBMSs and supports queries which reference data managed by more than one information system.

Past and current research and development in distributed databases allows integrated access by providing a homogenizing layer on top of the underlying information systems (UISs). Common approaches for supporting this layer focus on defining a single uniform database language and data model that can accommodate all features of the UISs. The two main approaches are known as view integration and multi-database language.

The view integration approach advocates the use of a relational, an Object-Oriented (OO), or a logic model both for defining views (virtual or snapshot) on the schemas of more than one target database and for formulating queries against the views. The view integration approach is one mechanism for homogenizing the schema incompatibilities of the UISs. In this framework, all UISs are converted to the equivalent schemas in the standard relational, OO, or logical data model. The choice of the uniform data model is based on its expressiveness, its representation power and its supported environment. This technique is very powerful from the user's point of view. It insulates the user from the design and changes of the underlying Information Management System (IMS). Thus, it allows the user to spend more time in an application environment. However, the view integration approach has a limited applicability (low degree of heterogeneity) because there are many situations when the semantics of the data are deeply dependent on the way in which the applications manipulate it, and are only partially expressed by the schema. Many recent applications in areas where traditional DBMSs are not usable fall into this situation (multi-media applications involving Text, Graphics and Images are typical examples). In addition, there are no available tools to semi-automate the building and the maintenance of the unified view which is vital to the success of this technique.

In the multi-database language approach, a user, or application, must understand the contents of each UIS in order to access the shared information and to resolve conflicts of facts in a manner particular to each application. There is no global schema to provide advice about the meta-data. Ease of maintenance and ability to deal with inconsistent databases make this approach very attractive. The major drawback of this approach is that the burden of understanding the underlying IMSs lies on the user. Accordingly, there is a tradeoff between this multi-database language approach and the view integration approach discussed above. This invention will address the deficiencies suffered from the above two approaches.

OBJECTS AND SUMMARY OF THE INVENTION

Therefore, it is an object of the present invention to provide a federated (global) architecture and system which are extensible and flexible for providing users with transparent integrated access to heterogeneous DBMS dispersed over a long haul network.

It is still another object of the present invention to provide an architecture and system for use in multiple large information management systems that are geographically dispersed, such as Command and Control, Computer Integrated Manufacturing, Medical Information Management, and many applications in intelligent analysis and decision support domains that will enable more effective and transparent access to existing high data volume sources that are collected and stored with different geographically dispersed DBMSs.

It is still another object of the present invention to provide a federated information management architecture and system where the users have only to learn one single interface and one unified view of the data.

The invention residing in the Federated Information Management (FIM) architecture described and claimed herein, allows the end-user to access geographically dispersed multiple information management systems. It provides the end-user with a unified view of the underlying information management systems. Data distribution and location transparencies are supported by the FIM architecture of the present invention. This means that the end-user does not need to know how the data is distributed and its location in order to share and access relevant data. In addition, the FIM architecture of the present invention can integrate both existing and new information management systems.

Among the advantages of the invention are the following:

1) The invention allows distributed access without a change to the underlying existing databases;

2) The invention allows a decrease in training cost and time for learning different DBMSs leading to an improvement in user productivity;

3) The invention is able to utilize, share and combine data that is otherwise dispersed in many different physical and logical locations;

4) The invention allows the overall system to evolve and include new information management systems with minimum change; and, 5) The invention is able to adapt and interface with normally incompatible different database vendors.

One novel aspect of the invention therefore is the federated architecture coupled with the Inter-Site Transaction Service (ISTS) architecture to allow transparent access to a wide variety of DBMSs while maintaining the local autonomy of the underlying DBMSs. With this invention architecture, the FIM of the present invention can run on top of different hardware, operating systems, communication networks, and DBMSs. In addition, the system of the present invention can evolve to include new target DBMSs with minimum changes. The federated architecture of the present invention is not limited to integrate relational DBMSs, but may also integrate legacy DBMSs such as hierarchical or network DBMSs, spatial information systems or geographical Information Systems, and text retrieval systems.

The present invention, therefore, provides an Intelligent Integration of Information environment to support seamless access to large scale heterogeneous information management systems which includes relational, spatial, and text systems. The invention includes the following features to support this environment:

(1) A federated architecture that supports transparent access to multiple database systems. It provides the end-user with a unified view of the underlying database systems. Local autonomy of the underlying database systems are fully maintained in the federated architecture. This means that the users can still use the same application to access the local databases, and only minimum change to the local database system is required for sharing and remote accessing relevant data. The architecture includes several distributed query optimization methods for fragmented and replicated data. This optimization ability improves the total query cost by reducing the transmission and the processing costs of the overall system. Also, the architecture uses fragmented dependencies information, called semantic query optimization, to improve the total cost. A high layer of distributed transaction services is also provided to separate the lower layer network communication protocols from the distributed query processing protocols. Detail design of this architecture and the Federated Information Management (FIM) are discussed below.

(2) The extension of the normally passive role of the conventional data dictionary (DD) repository into active and intelligent roles. In the active role, the Smart Data Dictionary (SDD) of the present invention automatically maintains data consistency as new applications or databases are added. To support reasoning and problem solving capabilities in a cohesive way, the SDD uses a multi-dimensional reference model that allows multiple integrated layers of abstractions spanning a wide variety of data types (text, spatial, etc.) The following concepts are preferably incorporated into the SDD's design to achieve greater efficiency and flexibility for acquiring, storing and manipulating such meta-data:

(a) SDD's modular architecture and multi-dimensional information structure for multimedia data and knowledge abstractions.

(3) The flexible SDD architecture allows the system to incorporate new information systems incrementally. But, in a large scale distributed information environment, the SDD becomes a bottle neck, and the knowledge represented becomes a large, complex and unmanageable hierarchy. The present invention minimizes these risks by developing a cooperative environment for multiple independent SDDs. In this cooperative model for integration and maintenance, we assume that each SDD can run autonomously and still be able to interact with other SDDs for appropriate knowledge without completely integrating all the foreign SDD's meta-data. Each SDD contains the meta-data about a specific domain which might include many databases; in addition, it will contain knowledge about its nearest neighbors, but not all neighbors. Despite many challenges such as meta-data consistency, multiple data/knowledge views, communication and data/knowledge transformation, the cooperation of multiple SDDs will be an ineluctable characteristic of large scale integrated information systems.

The above technologies and guiding concepts provide for a novel fusion of existing technologies (distributed systems, knowledge-based systems, object-oriented systems, heterogeneous databases and machine learning). Moreover, they form a basis for an intelligent integration of information design that represents a significant technical advancement over existing technologies. The novel features of construction and operation of the invention will be more clearly, apparent during the course of the following description,

DESCRIPTION OF THE PREFERRED EMBODIMENT

As indicated above, the federated approach of the present invention supports complete transparencies for data distribution and heterogeneities among information systems. It also maintains local site autonomy by minimizing the requirement for changes to all participant sites. This flexible architecture allows the system to evolve in the future and insulates the users from changes to the underlying hardware, IMS, database logical and physical designs. Once users have learned a single user interface and access methodology, they can access all databases without regard to their location and design. This increases productivity and saves training costs.

The present invention as embodied in a Federated Information Management System (FIMS) designed to access data from multiple Relational DataBase Management Systems (RDBMS), will now be described in a preferred form.

Figure 1:
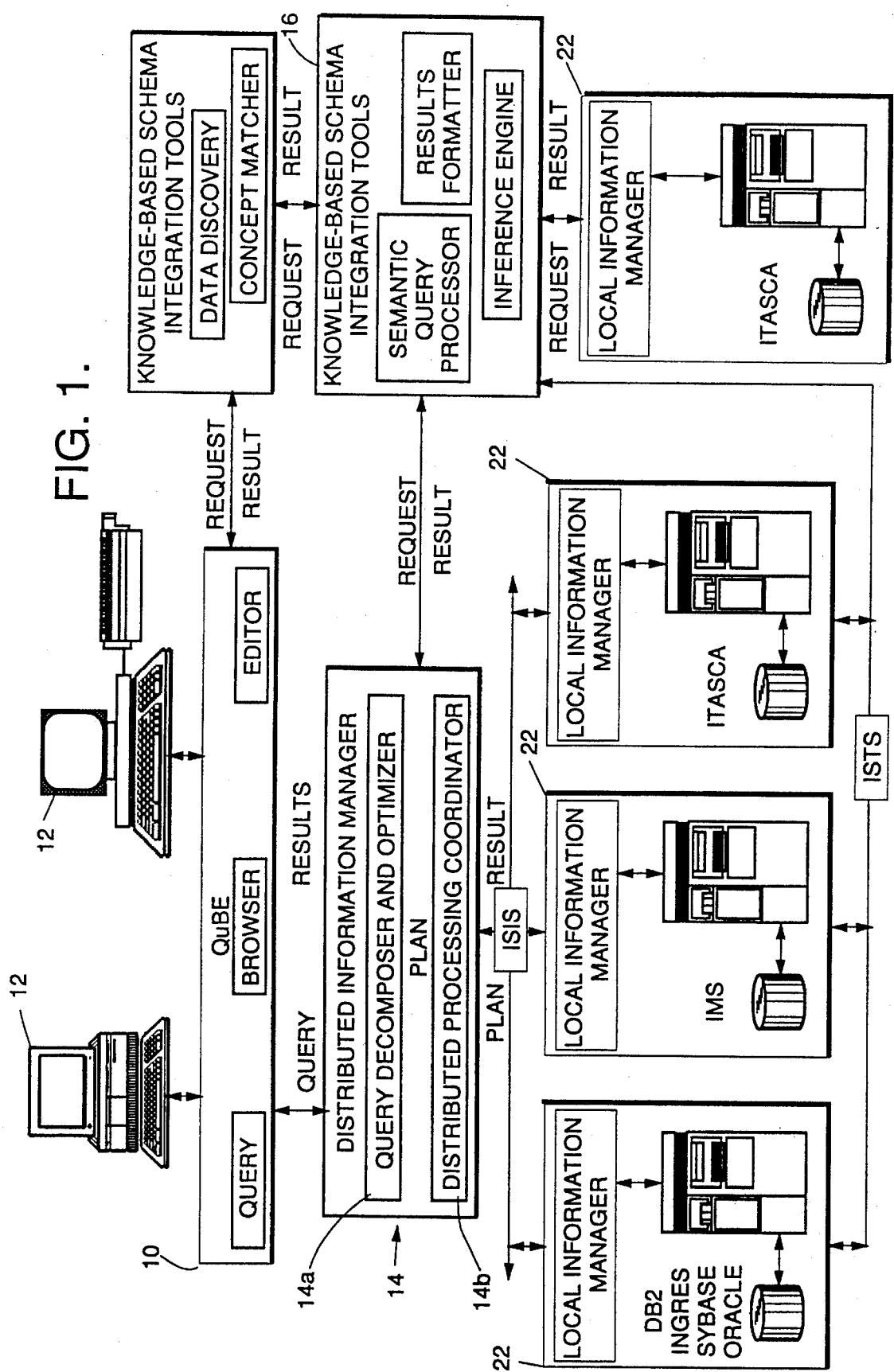
FIG. 1 is a diagram illustrating one mode of a data communication network between individual users or applications and underlying information systems in accordance with the present invention.

FIMS presents the user with the illusion of a single, integrated, non-distributed database through a uniform interface, a structured query language (SQL) or a graphical user interface (GUI). FIG. 1 describes the FIMS general architecture. It is composed of the following major components.

The Query Browser and Editor (QUBE) module 10 provides the users 12 with a uniform interface to access multiple databases. Users can formulate their requests using either a SQL or a GUI.

The Distributed Information Manager (DIM) 14 decomposes the global query into multiple queries. It provides a distributed access plan (DAP) which is optimized based on the sites' processing and the network communications costs. This access plan is composed of several local execution plans (LEP), one for each site.

Specifically, the user constructs a global query using QUBE. As far as the user is concerned, he or she only accesses a single (virtual) database. QuBE sends the global query to DIM. Based on the meta-data stored in the Smart Data Dictionary (SDD) 16, described below, DIM 14 decomposes the global queries into multiple local queries. It optimizes the total cost for executing the global query by minimizing the amount of data needed to be transferred among local sites, and by choosing the appropriate site for processing the local access plan. It will then coordinate the execution of multiple local queries.

The DIM 14 is composed to two high level components: the Query Decomposer and Optimizer 14A, and the Distributed Processing Coordinator 14B.

Figure 2:
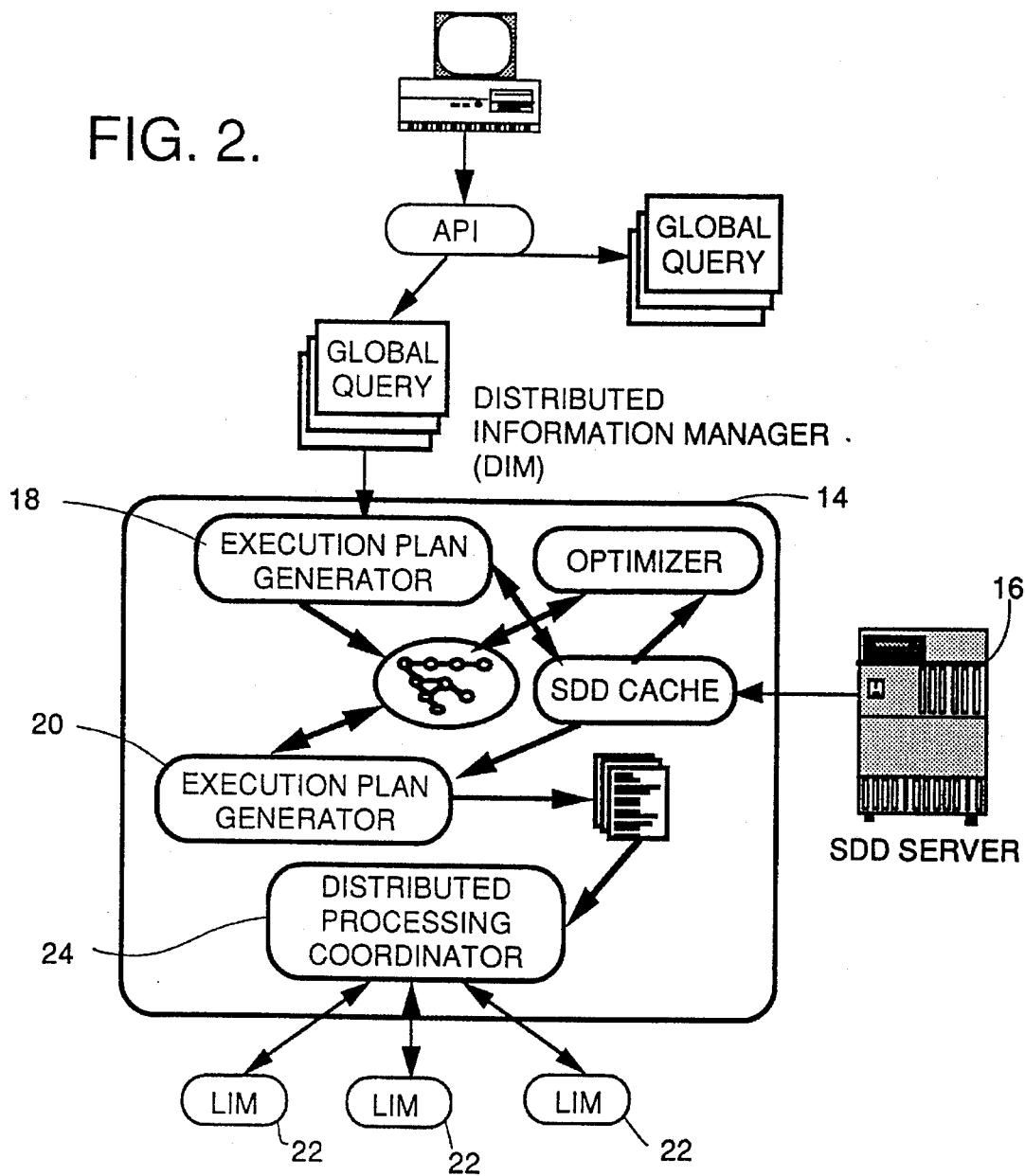
FIG. 2 is a diagram showing the component architecture and operational processing flow of a distributed information manager in accordance with the present invention.

FIG. 2 shows the DIM lower level sub-components and the information flow among them. The Query Decomposer and Optimizer (QDO) 14A decomposes the query into local sites' queries. Based on the site processing cost and transmission costs, the QDO builds an execution plan to minimize the query overall execution cost.

The Syntactic and Semantic Parser (SSP) 18 parses and validates the syntax of a query. It identifies and verifies the join connectivity. It interfaces with the Smart Data Dictionary (SDD) 16 to retrieve information about the Federated Semantic Schema (FSS) and Export Semantic Schema (ESS) from the underlying databases. The FSS and ESS represent the local schemata information, the unified view, and the inter-relationships among entities (views, objects) from multiple local schemata.

The Optimizer 14A provides careful planning to control the time that is required to process the query for access to data in multiple databases. This is important in local DBMSs, but it becomes even more important when data must be moved across a network. The Optimizer 14A retrieves the data distribution information (i.e., fragmented, replicated, or mixed fragmented and replicated), the transmission cost, and the processing cost from the SDD 16. It then uses an Integrated Replicated Semi-join algorithm to plan for the overall execution. The general execution plan is composed of the following steps:

Local Reduction. Based upon the predicates specified in the global query, this step reduces the amount of data as much as possible before sending the data to other sites.

Fragment Replication. The Optimizer decides which fragments need to be replicated in order to minimize the overall query execution cost.

Local Query Execution. The portion of the local query that is involved with the replicate fragment is executed, and the intermediate result is sent to the home site. The home site is defaulted to the user's site, unless specified by the user.

Result Integration. The home site integrates the intermediate results sent by the local sites.

The Execution Plan Generator (EPG) 20 translates the execution plan for each site from an internal data structure to the Distributed Intermediate Structured Query Language (DISQL), an extension of SQL. For each local site, the local execution plan is composed of three files containing SQL statements as well as schema and other data.

The local execution plan involves interfaces with the target DBMS. There are two major modes of coordination between DIM 14 and LIMs 22 for executing the local execution plan, namely autonomous and full-coordination mode.

In the autonomous mode, DIM 14 simply sends each LIM 22 its local execution plan which can be executed independently and in parallel. There is no coordination between DIM and LIMs in autonomous mode. Each LIM coordinates its own local execution plan which includes interfaces with local DBMS and interaction with other LIMS.

In the full-coordination mode, the DIM coordinates all the local execution plan by serializing each local execution step among LIMs. This means that no coordination is needed to be done at each LIM, because it only interacts with the DIM and not with other LIMs. Parallel processing of each LIM is inhibited in this case, and the DIM becomes a bottleneck.

Intuitively, the autonomous mode provides better performance through parallelisms. But deadlock problems might occur during communication among LIMs for fragment replication needed to be addressed. Deadlock problems can be resolved using either an operating system or a client/server's interrupt. In a long-haul network and large scale heterogeneous environment, using interrupts independently of the underlying operating systems is not currently available. For example, the Sybase Open Server does not support interrupts, it only provides the user with UNIX interrupts which are not usable for running LIMs in either operating system.

The present invention then uses an approach that employs a Distributed Processing Coordinator (DPC) 24 component in the DIM 14 to provide a semi-coordination mode which bases on the logic of each local execution step. This means that the autonomous mode is used only when no deadlock situation is expected, otherwise, the full-coordination mode is employed.

Figure 3:
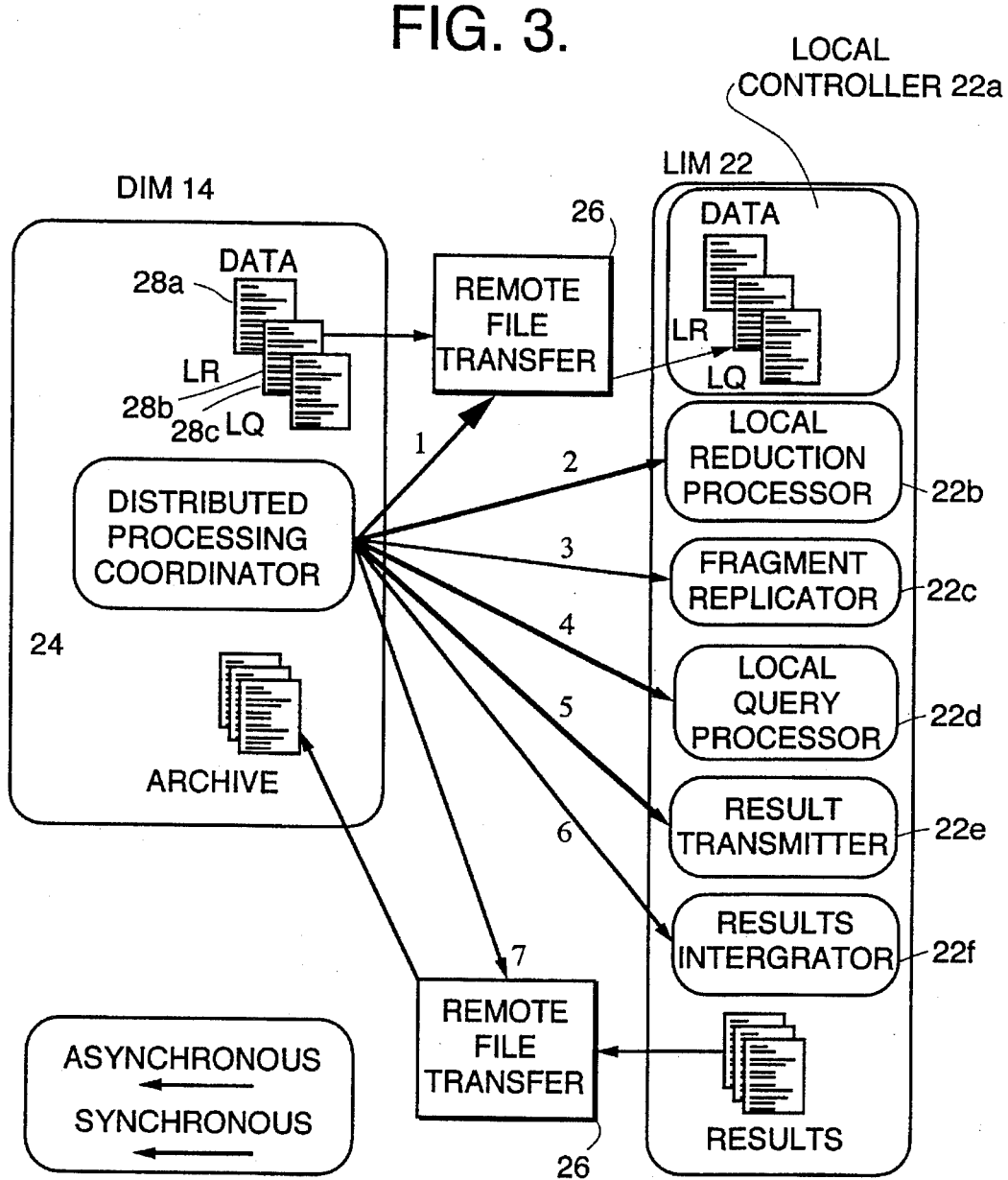
FIG. 3 is a diagram showing the component architecture and operational processing flow between a distributed information manager and an associated local information manager both in accordance with the present invention.
Figure 4:
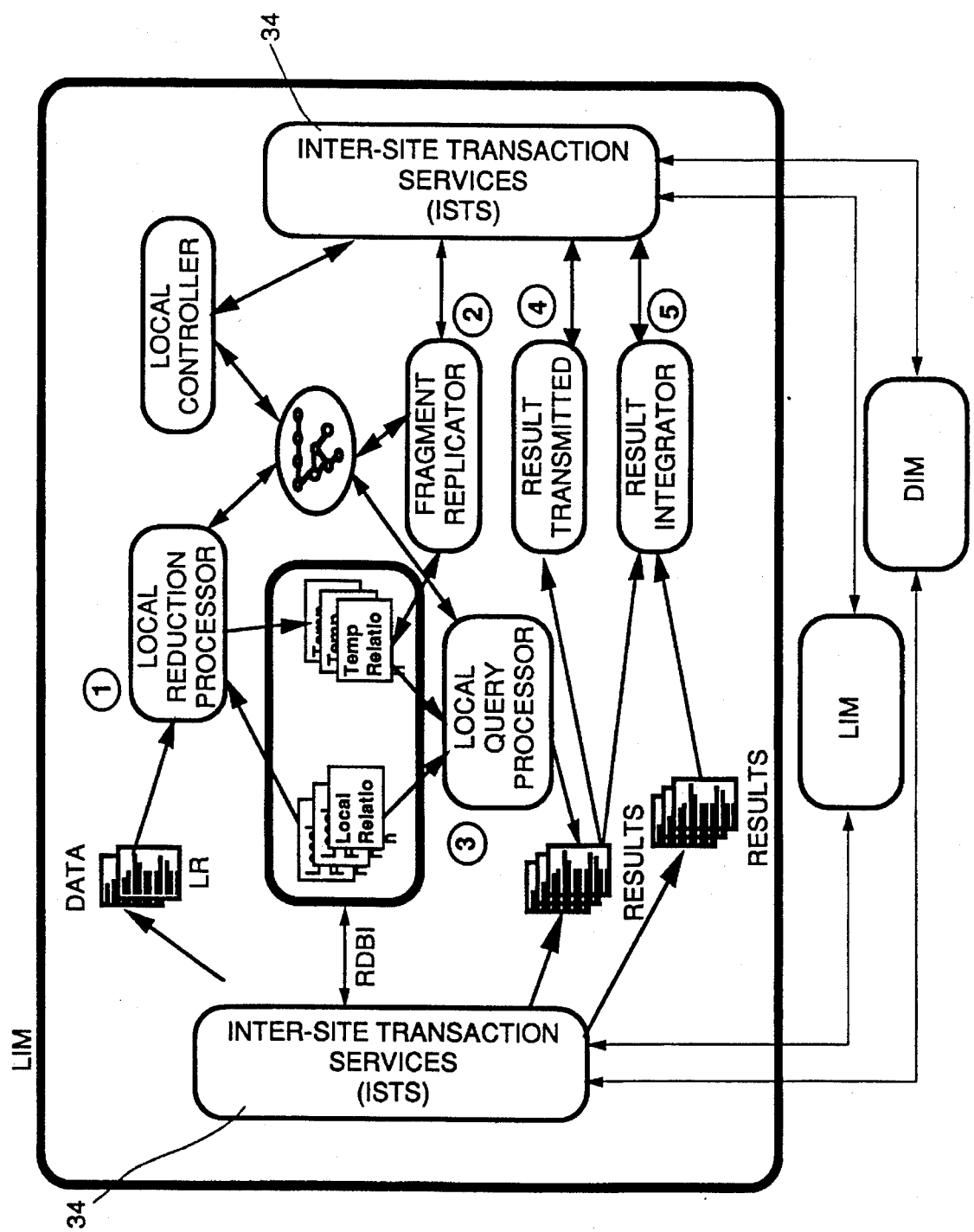
FIG. 4 is a diagram showing the component architecture and operational processing flow of a limited information manager in accordance with the present invention.

The basic execution steps which are coordinated by DPC 24 in semi-coordination mode are described as follows in FIGS. 3 and 4:

The first step is to send each LIM 22 its local execution plan. The local execution plan is in the form of three files which are sent to each LIM 22 using the remote file transfer utility 26 provided by the Inter-Site Transaction Service (ISTS) described below. The first file 28A is a data file containing fragment and distribution information needed to execute the local query. The second file 28B contains SQL statements to reduce the local data, thereby simplifying the local query and minimizing the amount of data transmitted between LIMs. The third file 28C contains the local query to be executed.

The second step is to send each LIM 22 a request to execute its local reduction queries. Since there is no interaction between LIMs during local reduction, this step is done asynchronously allowing the LIMs to execute in parallel.

The third step is to send each LIM a request to replicate relevant fragments. The information as to what fragments need to be replicated is contained in the data file 28A sent to the LIM 22 during step 1 above. This step is done sequentially so that only one LIM is doing fragment replication at any time. This will prevent deadlock situations by ensuring that all other LIMs will be available as servers to receive the fragment data. Depending on the timing, it is possible for a LIM to still be executing its local reduction plan when another LIM attempts to send it fragment data. In that case, the LIM sending the fragment data is guaranteed to have to wait only a limited amount of time before its request is serviced.

The fourth step is to request that each LIM 22 execute its local query. This step is executed asynchronously allowing parallel execution of multiple LIMs.

The fifth step is to send each LIM 22, except the home site, a request to send its intermediate result from step four above, to the home site. This step is executed synchronously to guarantee that the home site has received all the intermediate results.

The sixth step is to send a request to the home site to combine the intermediate results received from other sites with its own intermediate results, and to send the final result back to the DIM 14. This step is also done synchronously to prevent waiting global query requests at the DIM from executing before the results are received, thereby causing a deadlock situation.

As a seventh and final step, the DPC 24 archives the results and associates them with their schema and index for later retrieval by the application.

The Local Information Manager (LIM) 22 executes and monitors the local execution plan and interfaces with foreign DBMS for data retrieval. The specific LIM architecture will now be discussed.

For each DataBase Management System (DBMS), a LIM 22 is required to provide the mapping from the global view to the local view, the translation from DISQL to the target DBMS language, and the interface to the target DBMS. The sub-components of the LIM are: the Local Controller; the Local Reduction Processor; the Subquery Processor; the Result Integrator; the Relation Replicator; and, the Relational DBMS Interface. The LIM's preferred modular architecture facilitates the building of the new LIMs. For example, common features of relational databases such as "join" "projection" and "selection" are modularized into appropriate modules which can be shared between the LIM for each otherwise incompatible database.

The Local Controller (LC) 22A controls the execution of the local plan sent by the DIM 14 by coordinating operations of the other LIMs' components. As mentioned above, this can be done synchronously or asynchronously. In both modes, exactly the same components are used except that the timing of execution in synchronous mode is controlled by the DIM 14. A local execution plan is broken into five discrete steps: local reduction; fragment replication; local execution; result transmission; and, result integration. The last two steps are mutually exclusive since the home site performs result integration, but it never needs to transmit the results. In synchronous mode, each step is executed directly from the DIM through the ISTS; while, in asynchronous mode, all the steps are executed by the LC 22A through ISTS, but no coordination is needed by DIM.

The Local Reduction Processor (LRP) 22B is responsible for executing the SQL statements in the local reduction file received from the DIM 14. Before starting execution, the LIM's internal data structures must be initialized with the information obtained from the data file received from DIM 14. At this point, the LIM is initialized with the required information for the entire local plan, rather than just with the local reduction step. This information includes such items as: result fragments; local fragments; and, replicated fragments which will be used during execution and the schema for those fragments. Information in the data file also determines the sites destination for sending the intermediate results and fragments during replicated steps 3 and 5. The LIM also accesses the SDD 16 to retrieve meta-data about the schema of all local relations used in the local plan. Once the above initialization is completed, the LRP 22B executes each of the SQL statements contained in the local reduction file. These SQL statements are typically either "create" or "select" statements. "Create" statements are used to create a temporary relation to hold fragments received from other LIMs. "Select" statements are used to reduce data of local relations before replicating them to other sites.

Figure 5:
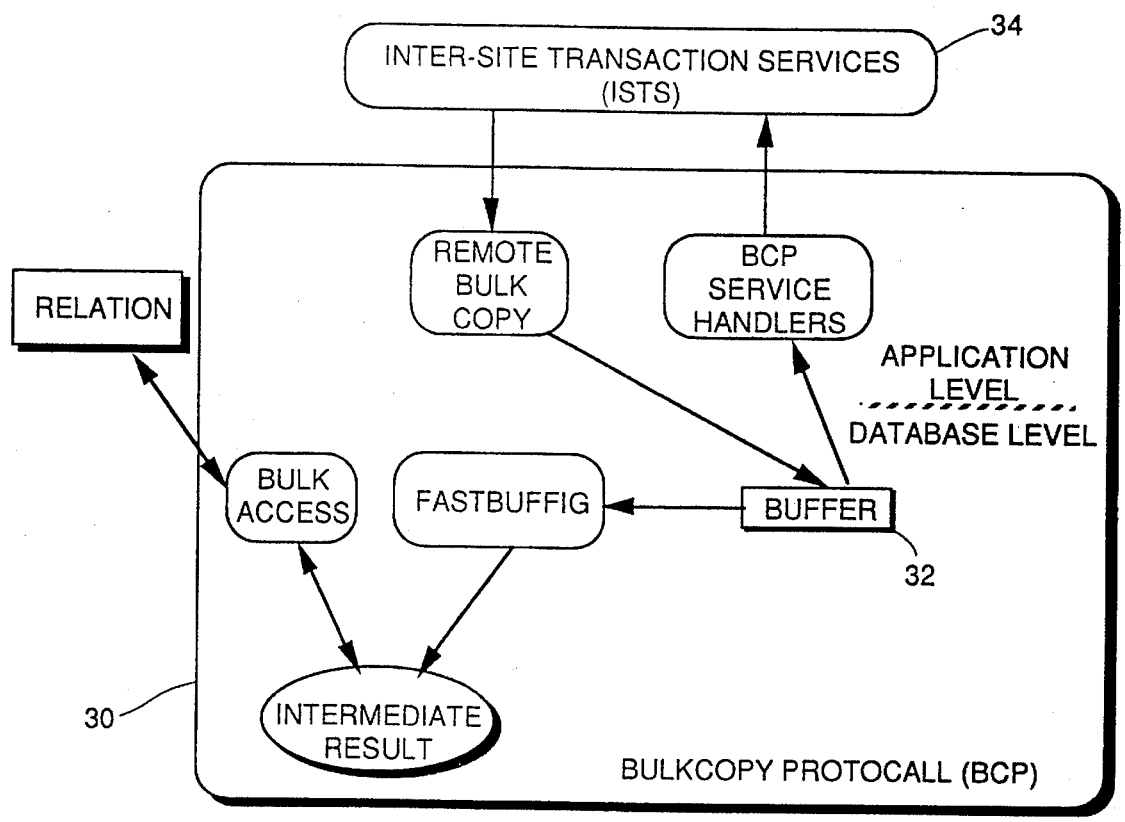
FIG. 5 is a diagram showing a Bulk-Load Copy Protocol (BCP) in accordance with the present invention.

The Fragment Replicator (FR) 22C uses one ISTS, a Bulk-load Copy Protocol (BCP) 30, for efficiently replicating fragmented relations between LIMs. As shown in FIG. 5, the BCP 30 can be further broken into an application layer which is RDBMS independent, and a lower database layer which is actually part of the Relational DataBase Interface.

The BCP is preferably implemented with two goals in mind: portability across RDBMSs and performance efficiency. Portability is achieved since the application layer is reusable across all LIMs. Unfortunately, the database layer needs to be customized for each DBMS. Efficiency is improved by requiring only one access to each relation being replicated regardless of the number of recipients. This is achieved by transmitting the relation data to each recipient as it is retrieved from the database. Efficiency is further improved by allowing the database layer to be customized, thereby taking advantage of any special bulkload transfer facilities supported by the underlying RDBMS. For example, in Sybase, the most efficient method of getting data both in and out of a relation is to use the "bulkload" utilities. While in Oracle, the most efficient way to get data out of a relation is to use an SQL query and array bindings. The most efficient way to insert the data into Oracle is to use the SQLLoader utility.

The application layer of the BCP 30 interacts with the database layer through an ASCII buffer 32 which allows it to be independent of the method used to retrieve the data. A set of buffering utilities convert data from the representation used in the output (e.g., row of data in memory in Oracle) to ASCII, and from ASCII to the representation used for input (e.g., sqlloader data file in Oracle). The actual data sent across the network contains relation schema and other information such as: number of rows; size of data, etc.

After the above local reduction and replicated fragments steps, all relevant fragments are copied and stored in temporary relations at designated sites. The Local Query Processor (LQP) 22D is responsible for executing queries in the local query file received from the DIM 14. Before executing these queries, the LQP 22D must combine all fragments of the same relation (those retrieved locally and those replicated from other LIMs). The LQP 22D generates the appropriate SQL statements needed to combine the fragments and executes them using the RDBI. After the fragments are combined, the local query is executed using the RDBI, and the intermediate results are stored in a file.

The Result Transmitter (RT) 22E component simply uses the remote file transfer (RFT) protocol provided by the ISTS 34 to transfer the file containing the above intermediate results to the home site.

The Result Integrator (RI) 22F combines all the intermediate results received from other LIMs (via their result transmitters) with its own intermediate results output by its Local Query Processor 22D. It will then return the combined results to the DIM 14. In asynchronous mode, the combined results are returned to the DIM 14 as a separate step in which the DIM 14 becomes a server, and the LIM 22 becomes a client. As previously discussed, this can potentially cause a deadlock situation to occur, since the DIM 14 may start the execution of another query before it has received the results of the previous query. This is acceptable if the DIM 14 can be interrupted, otherwise the LIM 22 will be waiting to transmit its combined results while the DIM 14 is waiting to execute the next query at the same LIM 22, thus causing a deadlock. Synchronous mode operation avoids this problem by returning the combined results to the DIM 14 as a response to the combine result request. In this way, the DIM 14 cannot start the execution of another query until result integration is complete at the home site, and the combined results are returned to the DIM 14.

At this juncture, it should be understood that the present invention also includes architecture where at least one LIM under a DIM is also a DIM, so that the same architecture is recursively replicated with the second DIM acting as a LIM to its overlying DIM and as a DIM to its underlying LIMs. In other words, the same architecture being described herein between a DIM and a series of LIM may be replicated in a recursive manner by replacing at least one of the underlying LIMs with a DIM and continuing the replication as needed to group LIMs into a logical or physical responding unit.

The Smart Data Dictionary (SDD) Server 16 contains information such as: schema; data distribution; sites configuration; domain knowledge; and, inter-site relationships. The SDD 16 itself is a database containing meta-data that can be used to support the DIM 14 and the LIM 22 in processing the queries. SDD data storage may be accomplished by a UNIX file system or an Object-Oriented Data-Base Management System (OODBMS) such as ITASCA.

The SDD server 16 supports request to access the SDD's meta-data stored in a UNIX file system from a remote site. DIM 14 and LIM 22 may access the SDD server 16 remotely to retrieve meta-data for parsing, translating, optimizing, and coordinating the global and local queries. In FIG. 1, the SDD server 16 acts as a replacement for the knowledge-based manager for SDD that stores in a UNIX file system.

Figure 6:
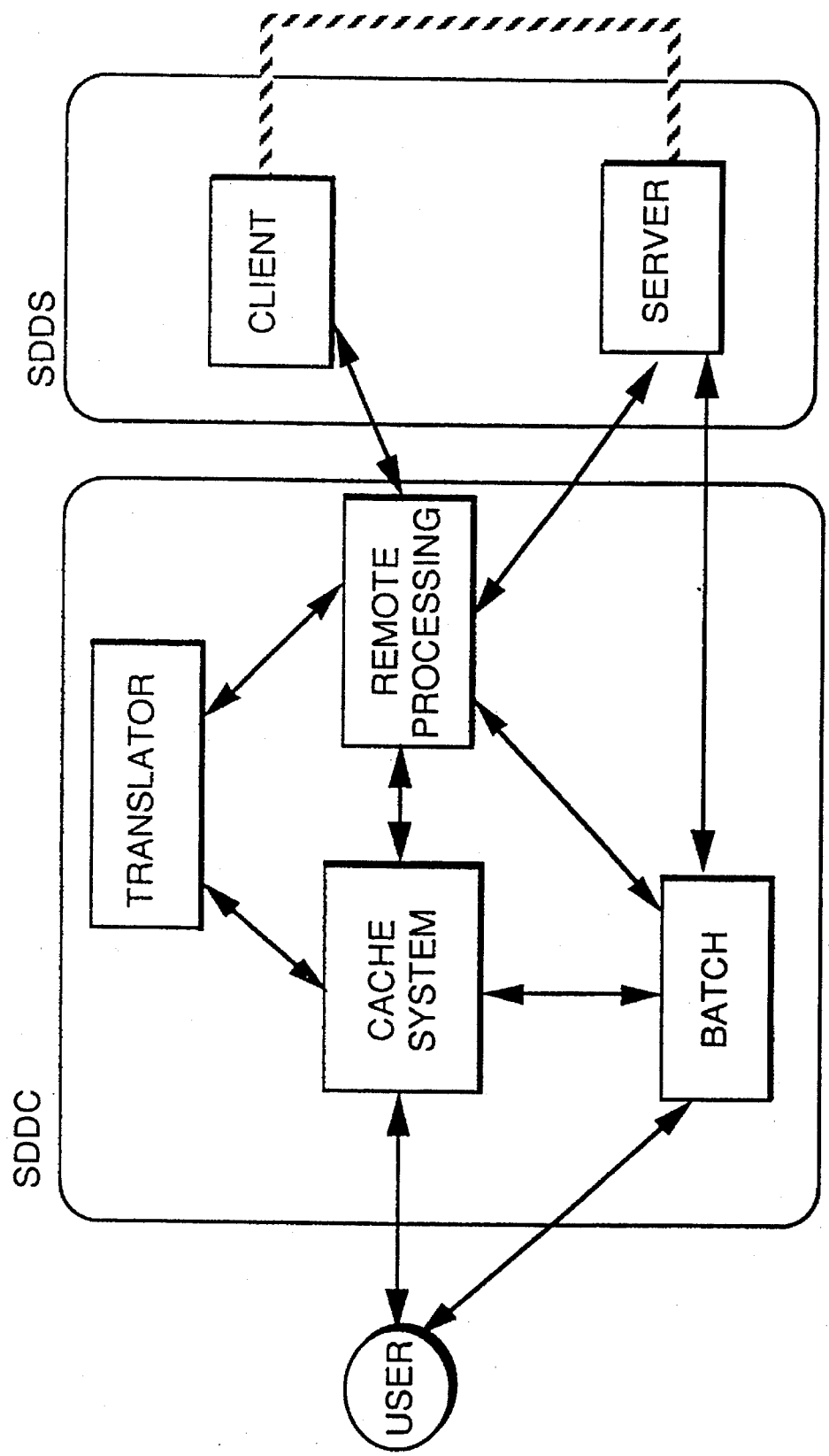
FIG. 6 is a diagram showing the component architecture and operational processing flow between a Smart Data Dictionary Cache Memory Management and a Smart Data Dictionary Server in accordance with the present invention.

The SDD contains meta-data such as: data distribution information, schema description, and FIM system configuration. The DIM uses the schema and data distribution to generate the execution plans. The LIM uses the schema to perform local queries and map local queries to other sites. Caching the meta-data at the processing site will greatly reduce the communication and accessing cost. For example, using Cache Memory Management (CMM), DIM 14 can access and cache the relevant data which might be used by the next query. This will eliminate unnecessary communication with the SDD 16 for retrieving the schema. Each LIM 22, DIM 14, and SDD server 16 uses the same CMM. FIG. 6 illustrates the CMM and the SDD server architecture.

Specifically, all access to the SDD schema is done through the CMM which holds in memory the schema for the most recently used relations. If the data is not in the cache memory, CMM transparently retrieves the relation locally (i.e., from a file or DBMS) or from another remote server, or both. Requests to the cache can either be for specific relations (such as relation name, field ID, number of fragments, etc.) or for entire schema. For efficiency reasons, the DIM and LIMs usually load the schema for all relations used in a query during the initialization hierarchy representing a sub-tree from the global view starting at a specific level. The cache may use a linear search to access information, and be built using a modular architecture which allows easy replacement of the algorithms to search the cache and selectively swap out candidates with more elaborate ones. The time of last use, the time brought into cache, and the number of times accessed are maintained for each cache entry to support such algorithms. The amount of memory used by the cache is a function of the number of relations it is holding. However, the maximum number of relations which it can hold must be specified when initializing the cache.

The SDD server has two Distributed Transaction Services (ISTS): "send catalog" and "send schema" to support the operation of the SDD cache memory management.

The "send catalog" service sends the client a copy of the relation catalog. The catalog contains a list of relations, each associated with an access type, and a server name. If a schema is not in cache memory, the access type determines how to retrieve the data such as from a local file, from a local RDBMS, or from another server. While the catalog may be retrieved prior to the execution of the first access to the cache, it is preferred that it be broadcast to all processes upon start up. The catalog will preferably be maintained so that it is consistent on all sites at the same time. The "send catalog" service is a special memory to memory transfer between the server and the client.

The "send schema" service accepts requests for multiple relations at different levels in the hierarchy. The SDD server contains the same cache as other client/servers. Meta-data will be first searched using the cache memory. If the meta-data is not found in cache, CMM connects to the server associated with the meta-data in the catalog, and retrieves the requested meta-data. The server can reside locally or remotely. CMM modular architecture provides the capability to adapt to different storage management such as: OODBMS, relation, file and knowledge base management.

Figure 7:
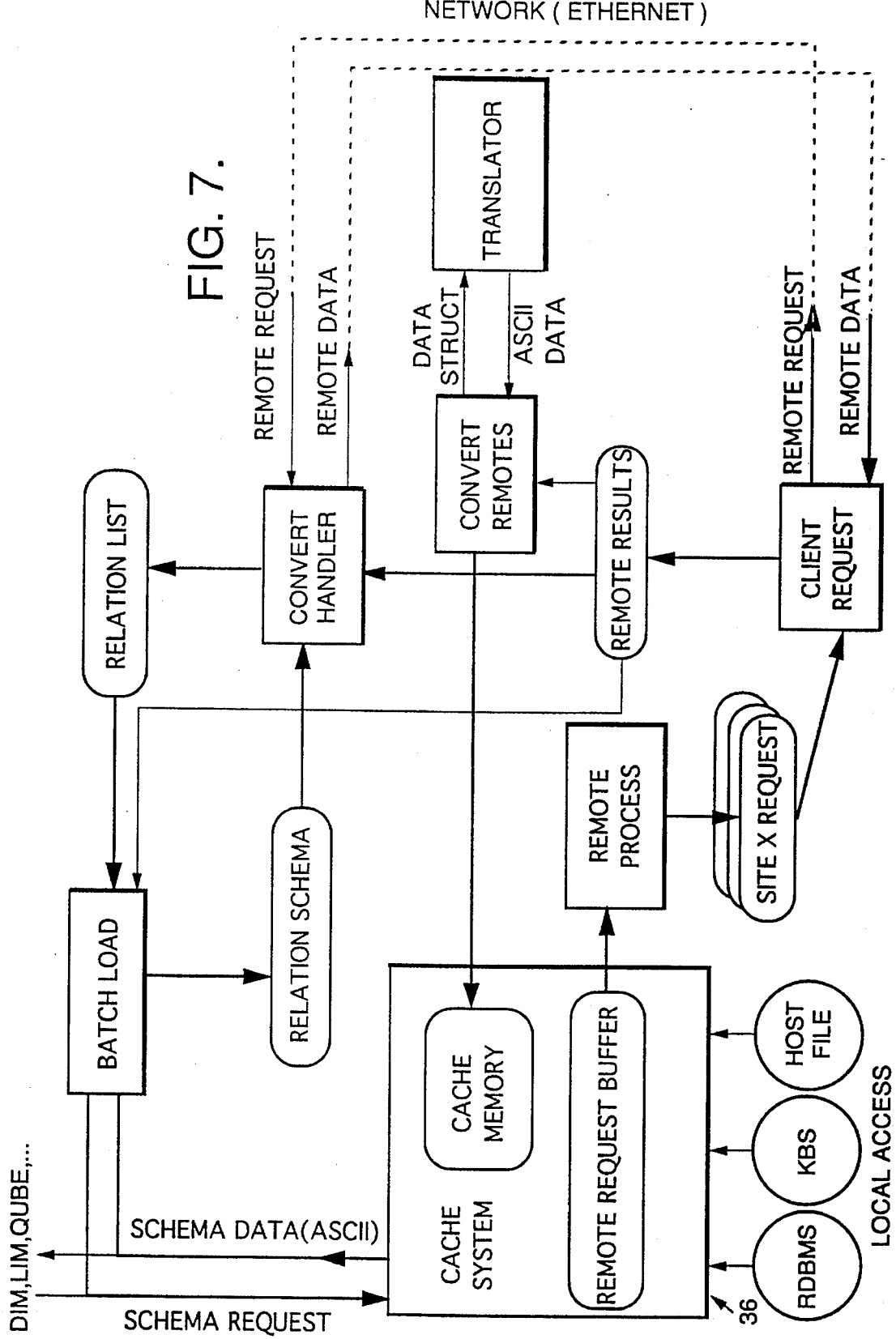
FIG. 7 is a diagram showing the component architecture and operational processing flow of a Cache Memory Management device in accordance with the present invention.

FIG. 7 shows the interactions between various components of CMM 36 and the server. The bulk of SDD server requests will be for schema access for which most of the work will be done by the local access methods of the cache in a transparent way to the service handler.

The Inter-Site Transaction Services (ISTS) 34 provides the inter-connection among sites. A set of distributed transaction services are provided to support the distributed access, local access plans, execution, and SDD meta-data access. The Distributed Processing Coordinator (DPC), local controller (LC), and CMM (Cache Memory Management) components use ISTS to support inter-process communications.

Specifically, ISTS 34 supports the inter-connection among different components: DIM 14; LIMs 22; and the SDD server 16 which may reside at different sites and communicating through different network protocols such as TCP/IP, XN25 etc. A set of Inter-Site Transaction Services 34 using the Sybase Client/Open Server is preferably developed to support this communication.

Figure 8:
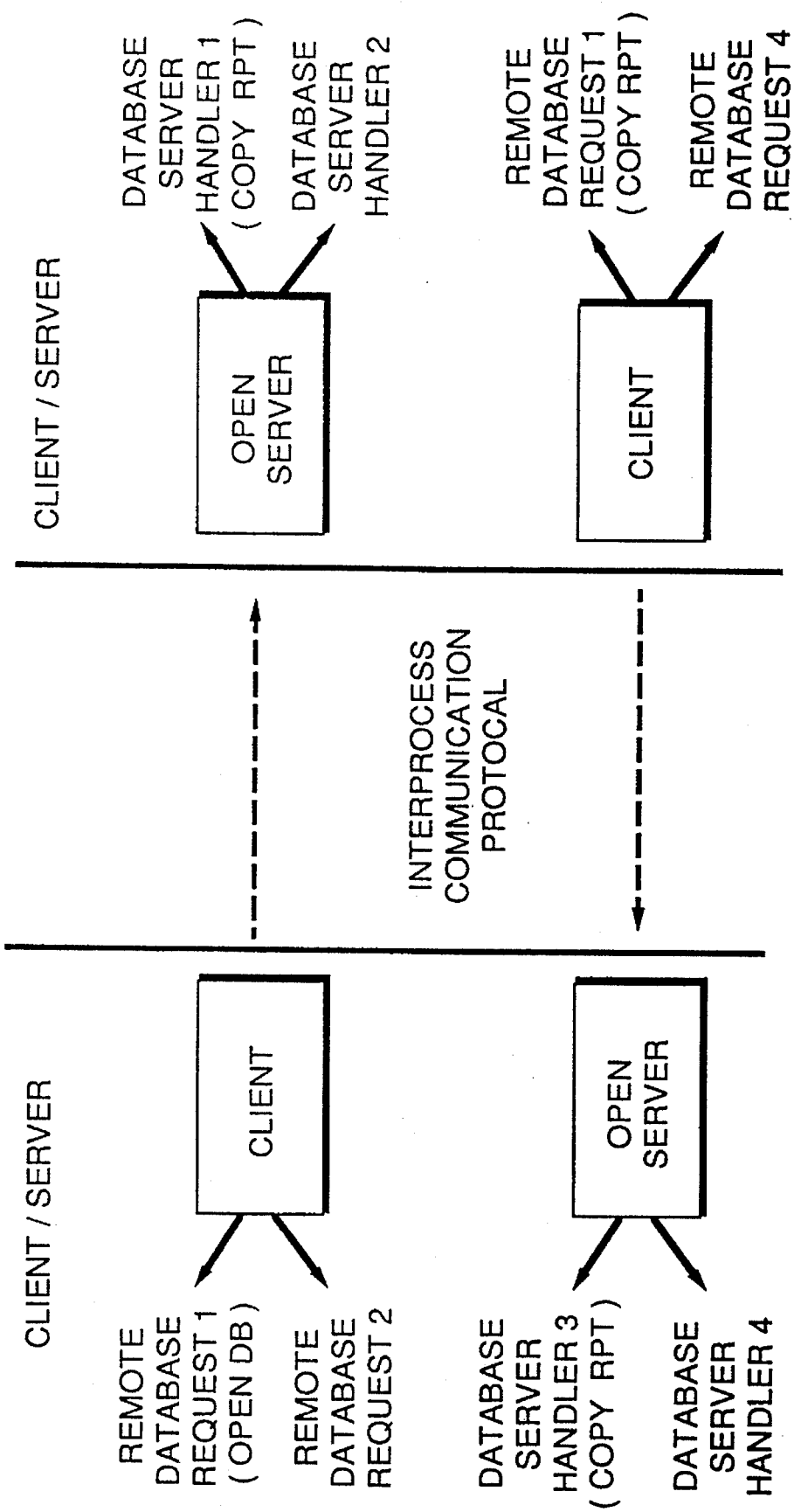
FIG. 8 is a diagram showing a Client/Server model in accordance with the present invention.

The Sybase Client/Open Server software provides the transparency of low level network protocols and manages resources of each connection. The Sybase Client/Open Server consists of Open Client, a programmable library interface for use by client applications, and the Sybase Open Server for use by servers of any type. These two interfaces offer a functionally rich set of library routines. It provides the necessary toolkit to implement transparent client/server communications between different database products such as Oracle and Ingres, and between non-database servers, e.g., UNIX files system, on heterogeneous computers and networks. The interfaces can run on separate processors and platforms, communicating through a variety of Local Area Networks (LAN) transport protocols (TCP/IP, XN25, etc.), or run together on a single processor as shown in FIG. 8. Network support is built into the products. The Open Server's multi-thread architecture delivers high performance as a shared database server.

It is preferred that the distributed processing architecture of the ISTS contain at least two major communication topologies: Hierarchical Distributed Processing Topology (HDPT) and Hierarchical Start Distributed Processing Topology (HSDPT) for connecting the Query Browser and Editor (QUBE); Knowledge Base Manager (KBM) or SDD server; DIM; and LIMs components.

Figure 9:
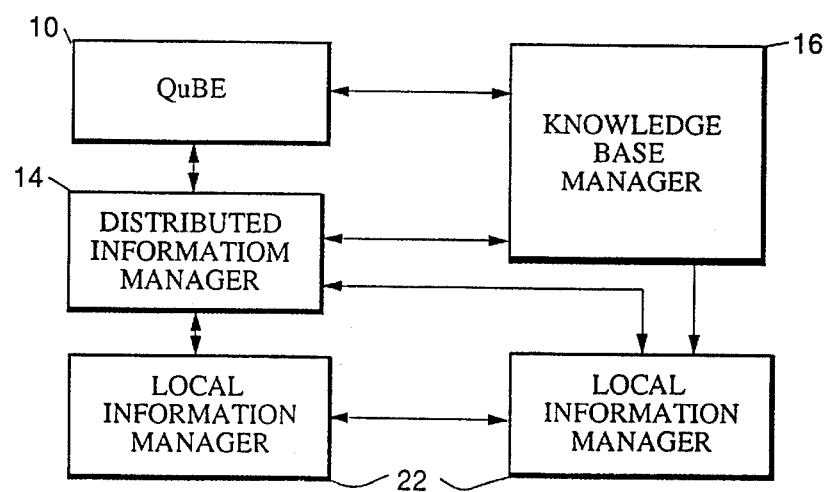
FIG. 9 is a diagram showing a Hierarchial Star Distributed Processing Topology in accordance with the present invention.
Figure 10:
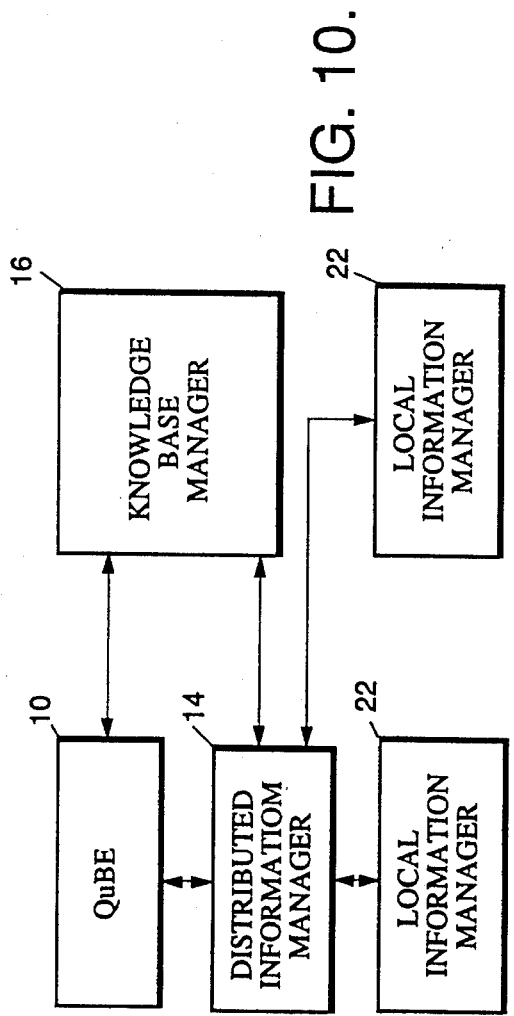
FIG. 10 is a diagram showing a Hierarchial Distributed Processing Topology in accordance with the present invention; and, FIG. 11 is a diagram showing a Distributed Transaction Service Hierarchy Topology in accordance with the present invention.

The Hierarchical Distributed Processing Topology (HDPT) is an abstract model shown in FIG. 9 used to support the distributed query processing of the present invention. This model improves the reliability and reduces the extent of communication and processing bottlenecks at the cost of inter-site communication and the complexity of the LIM. If the communication cost is negligible, then the HDPT described in FIG. 10 is more suitable.

In the Hierarchical Start Distributed Processing Topology (HSDPT) illustrated in FIG. 9, there is no communication among the LIMs 22, and all the coordination is done at the DIM 14. This topology simplifies the LIM development, and there is no cost of inter-communication among the LIMs. The DIM becomes a bottleneck and is very vulnerable to failure.

In general, the decision of choosing one topology over the other topology depends on the specific application environment.

Figure 11:
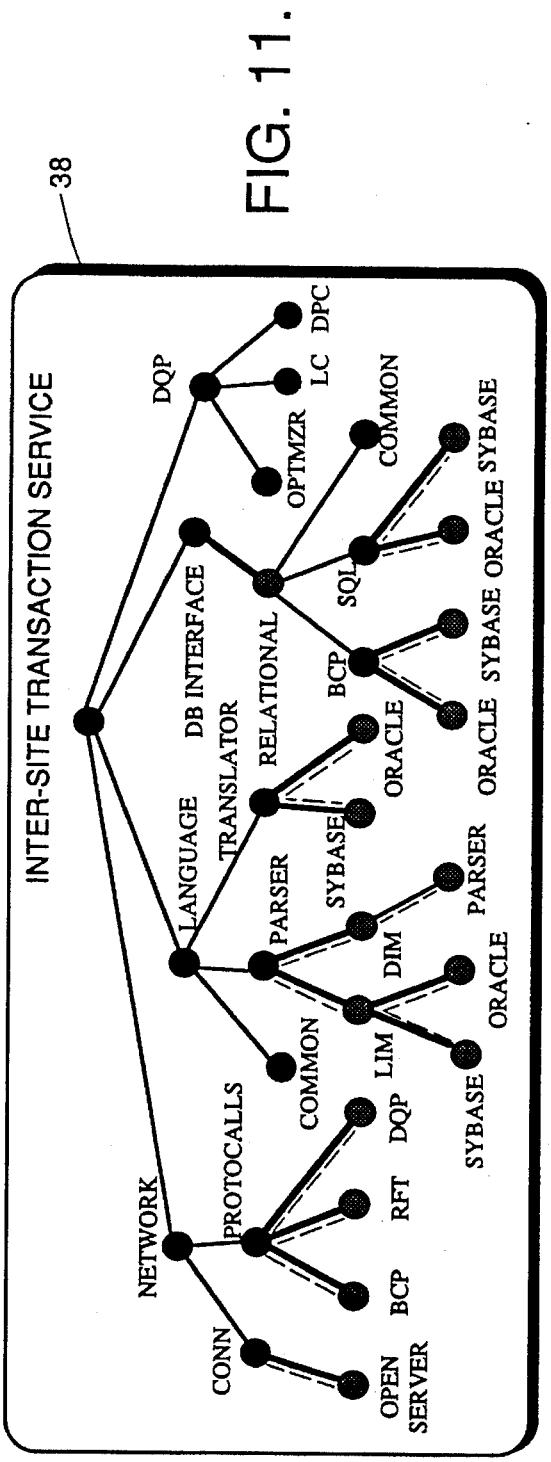

The present invention takes advantage of the Sybase Open Server features to support the client-to-server, server-to-server, and server-to-client communications in a heterogeneous environment among DIM, LIMs, KBM and QUBE. Each ISTS 38, as illustrated in FIG. 11, consists of a pair of Client Request and Server Service. The ISTS fits into the Application Layer of the standard OSI protocols, and consists of three sub-layers:

(a) Application Interface Layer: provides the high level interface to any application that requires the inter-process communication. Routines at this level are usually independent of the specific hardware and software and are therefore reusable across applications;

(b) Distributed Transaction layer: supports the necessary services for distributed databases. Routines at this level are usually hardware and/or software specific, and may therefore need to be modified when interfacing with different DBMSs or operating systems;

(c) Network Communications Layer: is the layer that provides the logical/physical connection and inter-connection among sites. The Sybase Client/Open Server may be used at this level.

The ISTS can be organized in a hierarchy as shown in FIG. 11 which encodes both a class hierarchy and a composition hierarchy. Dotted lines represent a "type-of" relation between services, while solid black lines represent a "part-of" relation between services. For example, a language interface which has three main components: a parser, a translator, and common utilities which are "part-of" but not a sub-class of a language interface. On the other hand, the Oracle and Sybase translators are a "type-of", or sub-class of language translators.

It is preferred that the major ISTS groups include:

(1) A Network Interface that provides connectivity plus high level protocols such as remote file transfer, remote bulk copy, meta-data processing and distributed query processing. The Connectivity services are at the DTS level and support connections and communications to other server/clients. In the preferred embodiment, the connectivity services are built on top of the Sybase open client/server libraries and provide the network building blocks for most other services. Protocols are at the application level and use connectivity services as well as other services from the hierarchy, for example, the BCP protocol in the network interface uses the BCP utilities part of the relational database interface.

(2) A Language Interface that provides for the mapping from one language to another such as from DISQL to Sybase SQL or Oracle SQL. Some common operations can be shared between language interfaces, but most likely it is preferred that each will require a separate parser and translator.

(3) A Database Interface that provides access to the underlying database supporting such operations as connection, query execution (open, parse, execute), and result retrieval (bind, next row). The interface also provides bulk access methods (in, out, buffer) if they exist.

(4) A Distributed Query Processing Interface that provides the services needed to support the DIM (optimizer) and the operation of the Distributed Processing Controller and the Local Controller (distributed query execute, local query execute, local reduction, etc.).

The ISTS layer architecture supports an open and modular implementation for interoperability of heterogeneous information management systems. It takes advantages of third party software. Changes to one layer will not affect other layers. For example, if one communication package were replaced for another, other layers implementation remain intact.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. In a computer data network having a communications medium commonly connecting a plurality of local site databases containing data with a plurality of users each capable of generating of global data query for accessing and retrieving data from said databases in accord with a single global query protocol, a method for controlling and directing a transmission of the user generated global data query to individual ones of the plurality of databases and for receiving and integrating the requested data received from the databases into a single response and for transmitting the integrated single response to the requesting user, said method comprising the following steps:

creating a smart data dictionary local site database profile containing data representing schema, data distribution, local site configuration and inter-site relationships of data among the local site databases in the network, for each local site database in the network;

communicating with said smart data dictionary local site database profile to retrieve data therefrom for decomposing the global data query into a local-site execution plan for retrieval of data from each local site database having data responsive to the global data query in accord with the data contained in said smart data dictionary local site database profile;

decomposing the global data query into a local-site execution plan for retrieval of data from each local site database having data responsive to the global data query in accord with the data contained in said smart data dictionary local site database profile;

transmitting that portion of said local-site execution plan to be executed to an appropriate said local site database for execution, receiving data from each local site database responsive to said local-site execution plan and creating a global response database containing such responsive data received from each local site database;

providing the user access to the global response database in accord with the single global query protocol.

2. A method as in claim 1 further including the steps of:

creating for each of said local site databases a plurality of local information manager means, each communicating with said smart data dictionary local site database profile for controlling data flow to and from a specified local site database in the network in response to that portion of said local-site execution plan received by the local site database;

generating, in accord with the data contained in said smart data dictionary local site database profile, a data retrieval request for execution by any other local site databases necessary to complete that portion of said local-site execution plan received by it for execution.

3. The method of claim 1 wherein the step of decomposing the global query further comprises:

parsing and validating the syntax of the global query;

identifying an appropriate said local site database containing the requested data by interfacing with the smart data dictionary local site database profile to retrieve information about a local query protocol and data semantic schema established for each individual local site database and generating a plurality of local site database queries for retrieving responsive data from each of the local site databases containing such responsive data;

optimizing the plurality of local site queries to generate a local-site execution plan that optimizes a total time for executing the global query by minimizing the amount of data needed to be transferred among local sites and by choosing an appropriate home local site for processing the local-site execution plan;

coordinating the execution of that portion of the local-site execution plan that applies to each of the local site databases by:

(1) creating for each of said local site databases at least one local information manager means;

(2) sending each said local information manager means that portion of said local-site execution plan applicable to data requests from its associated local site database;

(3) sending each said local information manager means a request to execute a local reduction plan for reducing queries;

(4) sending each local information manager means a request to replicate responsive data fragments;

(5) sending each local information manager means a request to execute asynchronously a local data query on its associated local site database;

(6) sending each local information manager means, except a local information manager for a home site database, a request to synchronously send data responsive to the local data query request to the local information manager for the home site;

(7) archiving the received data for transmission to the requesting user.

4. In a computer data network having a communications medium commonly connecting a plurality of databases containing data with a plurality of users each capable of generating a global data query for accessing and retrieving data from said databases in accord with a single query protocol, a globally integrated data retrieval controller architecture for controlling and directing a transmission of the user generated global data query to individual ones of the plurality of databases and for receiving and integrating the requested data received from the databases into a single response and for transmitting the integrated single response to the requesting user, said globally integrated data retrieval controller architecture comprising:

a smart data dictionary means containing a database of data representing schema, data distribution, local site configuration and inter-site relationships of data among the databases in the network, for each database in the network;

a data information manager means communicating both with said smart data dictionary means to retrieve data therefrom, and with said user to receive said global data query therefrom and to transmit responsive data thereto, for decomposing the global data query into a local-site execution plan for retrieval of data from each database having data responsive to the global data query in accord with the data contained in said smart data dictionary means, and for transmitting that portion of said local-site execution plan to be executed to an appropriate said database for execution, and receiving data therefrom responsive to said local-site execution plan;

a plurality of local information manager means, each communicating with said data information manager means and said smart data dictionary means, for controlling data flow to and from a specified database in the network in response to that portion of said local-site execution plan received from said data information manager means and for transmitting retrieved data responsive to that portion of said local-site execution plan to said data information manager means, each said local information manager means further adapted for generating, in accord with the data contained in said smart data dictionary means, a data retrieval request for execution by another local information manager means and for receiving data therefrom in response thereto, in order to complete that portion of said local-site execution plan received by it for execution.

5. A globally integrated data retrieval controller architecture as in claim 4 further comprising:

at least one local information manager means controlling data flow to and from at least two local databases and adapted to decompose that portion of said local site execution plan received from said data information manager means into a sub-local site execution plan for retrieval of data responsive to that portion of said local site execution plan received from said data information manager means from each of said controlled local databases.

6. A globally integrated data retrieval controller architecture as in claim 4 wherein said data information manager means comprises:

syntactive and semantic parser means interfacing with said smart data dictionary means for retrieving data representing local schema information and the inter-relationships among data, and for parsing and validating the syntax of the global data request using such data retrieved from said smart data dictionary means.

7. A globally integrated data retrieval controller architecture as in claim 4 wherein said data information manager means comprises:

optimizer means interfacing with said smart data dictionary means for retrieving data representing local schema information and the inter-relationships among data, and for minimizing the amount of data needed to be transferred among local site databases and for choosing an appropriate said local site database for processing each portion of the local-site execution plan.

8. A globally integrated data retrieval controller architecture as in claim 4 wherein said data information manager means comprises:

local site execution plan control means interfacing with each of said local site databases to send each local site database that portion of said local site execution plan necessary to extract responsive data from each said local site database.

9. A globally integrated data retrieval controller architecture as in claim 4 wherein said local information manager means further includes:

local controller means for controlling the execution of that portion of the local site execution plan sent by the data information manager means by coordinating all internal operations.

10. A globally integrated data retrieval controller architecture as in claim 9 wherein said local controller means operates synchronously.

11. A globally integrated data retrieval controller architecture as in claim 9 wherein said local controller means operates asynchronously.

12. In a computer data network having a communications medium commonly connecting a plurality of databases containing data with a plurality of users each capable of generating a global data query for accessing and retrieving data from said databases in accord with a single query protocol, a globally integrated data retrieval controller architecture for controlling and directing a transmission of the user generated global data query to individual ones of the plurality of databases and for receiving and integrating the requested data received from the databases into a single response and for transmitting the integrated single response to the requesting user, said globally integrated data retrieval controller architecture comprising:

a smart data dictionary means containing a database of data representing schema, data distribution, local site configuration and inter-site relationships of data among the databases in the network, for each database in the network;

a data information manager means communicating both with said smart data dictionary means to retrieve data therefrom, and with said user to receive said global data query therefrom and to transmit responsive data thereto, for decomposing the global data query into a local-site execution plan for retrieval of data from each database having data responsive to the global data query in accord with the data contained in said smart data dictionary means, and for transmitting that portion of said local-site execution plan to be executed to an appropriate said database for execution, and receiving data therefrom responsive to said local-site execution plan, said data information manager means including syntactic and semantic parser means interfacing with said smart data dictionary means for retrieving data representing local schema information and the interrelationships among data, and for parsing and validating the syntax of the global data request using such data retrieved from said smart data dictionary means, said data information manager means further including optimizer means interfacing with said smart data dictionary means for retrieving data representing local schema information and the inter-relationships among data, and for minimizing the amount of data needed to be transferred among local site databases and for choosing an appropriate said local site database for processing each portion of the local-site execution plan, said data information manager means also including local-site execution plan control means interfacing with each of said local site databases to send each local site database that portion of said local-site execution plan necessary to extract responsive data from each said local site database;

a plurality of local information manager means, each communicating with said data information manager means and said smart data dictionary means, for controlling data flow to and from a specified database in the network in response to that portion of said local-site execution plan received from said data information manager means and for transmitting retrieved data responsive to that portion of said local-site execution plan to said data information manager means, each said local information manager means further adapted for generating, in accord with the data contained in said smart data dictionary means, a data retrieval request for execution by another local information manager means and for receiving data therefrom in response thereto, in order to complete that portion of said local-site execution plan received by it for execution, at least one local information manager means controlling data flow to and from at least two local databases and adapted to decompose that portion of said local-site execution plan received from said data information manager means into a sub-local-site execution plan for retrieval of data responsive to that portion of said local-site execution plan received from said data information manager means from each of said controlled local databases, said local information manager means further includes local controller means for controlling the execution of that portion of the local-site execution plan sent by the data information manager means by coordinating all internal operations.

13. A globally integrated data retrieval controller architecture as in claim 12 wherein said local controller means operates synchronously.

14. A globally integrated data retrieval controller architecture as in claim 12 wherein said local controller means operates asynchronously.

15. A computer data network controlling and directing transmission of a user generated global data query to individual ones of a plurality of nodes and associated databases and for receiving and integrating the requested data received from the databases through the nodes into a single response and for transmitting the integrated single response to the requesting user, comprising:

a communication medium connecting the nodes with a plurality of users, each capable of generating a global data request for accessing and retrieving data from the databases through their associated nodes in accord with a single query protocol;

a smart data dictionary node connected to the computer data network and controlling input/output access to a database of data representing schema, data distribution, local site configuration and inter-site relationships of data among the nodes and their associated databases in the network, for each node and associated database in the network;

a data information manager controller communicating both with said smart data dictionary node to retrieve data therefrom, and with said user to receive said global data query therefrom and to transmit responsive data thereto, for decomposing the global data query into a local-site execution plan for retrieval of data from each database through its associated node, said database having data responsive to the global data query in accord with the data contained in said database associated with said smart data dictionary node, and for transmitting that portion of said local-site execution plan to be executed to an appropriate node and associated database for execution, and receiving data therefrom responsive to said local-site execution plan;

a plurality of local information manager controllers, each communicating with said data information manager controller and said smart data dictionary node, for controlling data flow to and from a specified database in the network in response to that portion of said local-site execution plan received from said data information manager controller and for transmitting retrieved data responsive to that portion of said local-site execution plan to said data information manager controller, each said local information manager controller further adapted for generating, in accord with the data contained in said database associated with said smart data dictionary node, a data retrieval request for execution by another local information manager controller and for receiving data therefrom in response thereto, in order to complete that portion of said local-site execution plan received by it for execution.

16. A computer data network as in claim 15 further comprising:

a least one local information manager controller controlling data flow to and from at least two local databases and adapted to decompose that portion of said local site execution plan received from said data information manager controller into a sub-local site execution plan for retrieval of data responsive to that portion of said local site execution plan received from said data information manager controller from each of said controlled local databases.

17. A computer data network as in claim 15 wherein said data information manager controller comprises:

a syntactic and semantic parser device interfacing with said smart data dictionary node for retrieving data representing local schema information and the inter-relationships among data, and for parsing and validating the syntax of the global data request using such data retrieved from said smart data dictionary node.

18. A computer data network as in claim 15 wherein said data information manager controller comprises:

a data optimizer unit interfacing with said smart data dictionary node for retrieving data representing local schema information and the inter-relationships among data, and for minimizing the amount of data needed to be transferred among local site databases and for choosing an appropriate said local site database for processing each portion of the local-site execution plan.

19. A computer data network as in claim 15 wherein said data information manager controller comprises:

local-site execution plan control controllers interfacing with each of said local site databases to send each local site database that portion of said local-site execution plan necessary to extract responsive data from each said local site database.

20. A computer data network as in claim 15 wherein said local information manager controller further includes:

a local controller for controlling the execution of that portion of the local site execution plan sent by the data information manager controller by coordinating all internal operations.

21. A computer data network as in claim 20 wherein said local controller operates synchronously.

22. A computer data network as in claim 20 wherein said local controller operates asynchronously.

\* \* \* \* \*